US008244682B2

(12) United States Patent  
Ylonen

(10) Patent No.: US 8,244,682 B2
(45) Date of Patent: Aug. 14, 2012

(54) SAVING SNAPSHOT OF A KNOWLEDGE BASE WITHOUT BLOCKING

(75) Inventor: Tatu J Ylonen, Espoo (FI)

(73) Assignee: Clausal Computing Oy (FI)

( * ) Notice: Subject to any disclaimer, the term of this patent is extended or adjusted under 35 U.S.C. 154(b) by 220 days.

(21) Appl. No.: 12/604,630

(22) Filed: Oct. 23, 2009

(65) Prior Publication Data

US 2011/0099151 A1  Apr. 28, 2011

(51) Int. Cl.
*G06F 7/00* (2006.01)
(52) U.S. Cl. ......... 707/657; 707/813; 707/815; 707/831
(58) Field of Classification Search .................. 707/657, 707/813, 815, 831
See application file for complete search history.

(56) References Cited

U.S. PATENT DOCUMENTS

| 5,008,786 A | 4/1991 | Thatte |
| 7,328,226 B1 | 2/2008 | Karr et al. |
| 2006/0037003 A1* | 2/2006 | Long et al. ..................... 717/127 |
| 2007/0088762 A1* | 4/2007 | Harris et al. .................. 707/201 |
| 2007/0130228 A1 | 6/2007 | Breau et al. |

OTHER PUBLICATIONS

"Why Object Serialization is Inappropriate for providing persistence in Java", Huw Evans, Department of Computer Science The University of Glasgow, Nov. 6, 2007.*
International Search Report, Mar. 10, 2011.
Na, Wen-Wu et al, VSD: A Framework of Stackable Virtual Snapshot Device, IEEE International Conference on Networking, Architecture, and Storage, Jul. 9-11, 2009, pp. 253-256, IEEE.

* cited by examiner

*Primary Examiner* — Etienne Leroux
*Assistant Examiner* — Cindy Nguyen

(57) ABSTRACT

A consistent snapshot of a large main memory knowledge base is saved to persistent storage without blocking the application for the duration of serializing and writing the knowledge base. Taking the snapshot comprises bringing the knowledge base to a consistent state (in a multithreaded application), using virtual memory facilities to obtain a copy-on-write copy of the knowledge base in memory, and using a separate thread or process to serialize the copy-on-write copy to persistent storage.

11 Claims, 2 Drawing Sheets

SAVING SNAPSHOT OF A KNOWLEDGE BASE WITHOUT BLOCKING

CROSS-REFERENCE TO RELATED APPLICATIONS

Not Applicable

INCORPORATION-BY-REFERENCE OF MATERIAL SUBMITTED ON ATTACHED MEDIA

Not Applicable

TECHNICAL FIELD

The present invention relates to management of persistence in knowledge bases in knowledge processing systems.

BACKGROUND OF THE INVENTION

Many knowledge base systems must be running continuously, responding to user queries and updating their knowledge base. Since main memory sizes have grown tremendously in the last decade or two, it is now feasible to keep even very large (tens or hundreds of gigabytes) knowledge bases in main memory. Such main memory based management of a large knowledge base offers many benefits, including overhead reduction by several orders of magnitude compared to disk-based knowledge bases.

However, all computer systems crash and must be restarted every now and then due to, e.g., software or hardware failures, power outages, and operator errors.

It is thus necessary for such systems to save the knowledge base to disk at least periodically. However, linearizing and writing tens or hundreds of gigabytes of complex, usually cyclic data can be quite time-consuming, generally taking at least several minutes to complete. Furthermore, the consistency of the saved copy must be ensured. This can be done using either complicated transaction mechanisms as known in the database literature, or by stopping all other activity (or at least updates) for the duration of serializing the snapshot.

It is generally not acceptable to stop all activity in interactive on-line systems for several minutes at a time. On the other hand, transaction mechanisms, especially if they are disk-based, tend to have rather high overhead that affects all operations in the system.

A low-overhead method of saving consistent snapshots of a large knowledge base in main memory is thus needed, and devices and computer software products utilizing such methods could have important competitive advantages.

For an in-depth description of various operating system concepts, such as virtual memory, address spaces, virtual addresses, pages, processes, threads, scheduling, the mmap function, and the fork function, the reader is referred to the book Uresh Vahalia: UNIX Internals—The New Frontiers, Prentice Hall, New Jersey, 1996. For an introduction to knowledge bases and knowledge representation, one is referred to R. Brachman and H. Levesque: Knowledge Representation and Reasoning, Morgan Kaufmann, 2004; H. Helbig: Knowledge Representation and the Semantics of Natural Language, Springer, 2006; and I. Vlahavas and N. Bassiliades: Parallel, Object-Oriented and Active Knowledge Base Systems, Kluwer, 1998. One skilled in the art should understand both knowledge base and knowledge representation concepts and operating system concepts.

BRIEF SUMMARY OF THE INVENTION

A first aspect of the invention is a method for saving a snapshot of a large knowledge base without blocking, comprising:
bringing, using a consistent state means in a computer, the knowledge base to a consistent state;
creating, using a copy-on-write means in a computer, a copy-on-write virtual copy of the knowledge base; and
serializing, using a serializing means in a computer, the virtual copy to persistent storage.

A second aspect of the invention is a computer comprising:
one or more processors (101), with at least one of the processors equipped with a virtual memory means (102);
a consistent state means (109);
a copy-on-write means (108) that makes use of the virtual memory means to make a virtual copy of a knowledge base brought into a consistent state using the consistent state means; and
a serializing means (110) for serializing the virtual copy of the knowledge base to persistent storage.

A further aspect of the invention is a computer program product stored on a computer readable medium operable to cause a computer to save a snapshot of a large main memory knowledge base without blocking, comprising:
computer usable program code means for bringing the knowledge base to a consistent state;
computer usable program code means for creating a copy-on-write virtual copy of the knowledge base brought to a consistent state; and
computer usable program code means for serializing the virtual copy to persistent storage.

BRIEF DESCRIPTION OF THE SEVERAL VIEWS OF THE DRAWING(S)

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
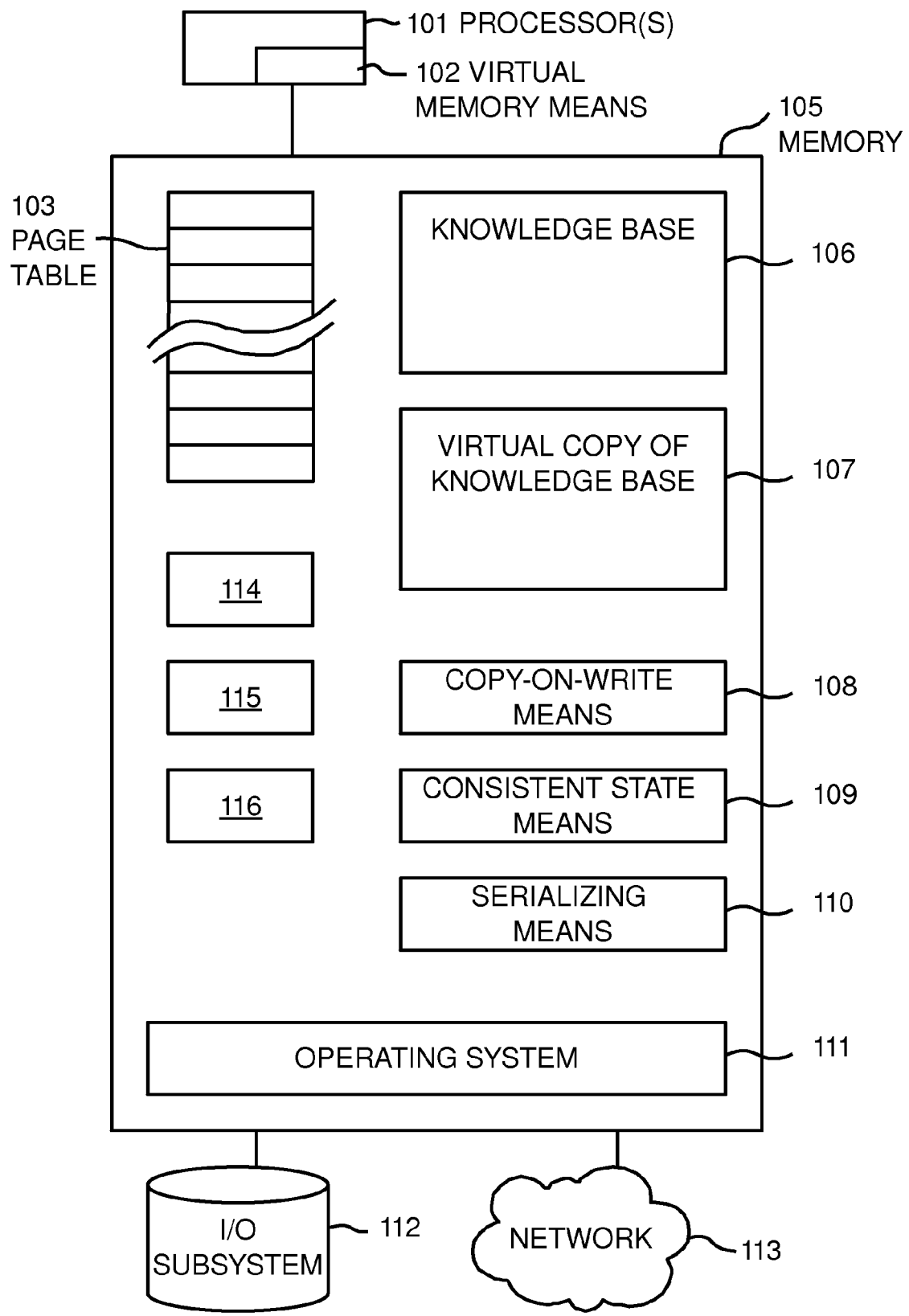
FIG. 1 illustrates a computer system according to an exemplary embodiment of the invention.

FIG. 1 illustrates a computer (e.g., cluster, server, desktop, mobile device, embedded computer, processor, or ASIC) according to a possible embodiment of the invention. The computer comprises one or more processors or processor cores (101) equipped with virtual memory means (102). Typically such virtual memory means comprises a TLB (Translation Lookaside Buffer) and mechanisms for mapping virtual memory addresses used by application programs to physical addresses used to access physical memory devices. Virtual memory is usually either page-oriented (as in most modern processors) or segmented (as in, e.g., Intel 80286 family, though various variants of segmented memory can also be found in newer processors), though other kinds of virtual memory may also be used. Sometimes processors may also comprise one or more of the other elements of FIG. 1 within the processor; in particular, embedded processors often incorporate some or all of the memory (RAM and/or ROM), and special purpose processors or ASICs may implement some or all of the various operational elements (e.g., 108, 109, 110, 111) directly in hardware or using special co-processors or support ships, either partially or fully.

As is known in the art, many processors use a page table (103) to map virtual addresses to physical addresses. Usually the page table has multiple levels. Some processors also use other mechanisms such as hash tables, or may delegate the actual mapping details to firmware (e.g., the MIPS architecture used software traps to perform the mapping and load the mapping for a page into the TLB).

Many modern computers support multiprocessing. (114), (115), and (116) illustrate processes or threads. There may be any number of them. A process basically has its own virtual address space (and often a dedicated page table) and may comprise one or more threads, whereas a thread generally refers to an execution (virtual processor) and typically has its own stack and execution context. Execution of threads and processes is usually managed by a scheduler, which is part of the operating system (111), as is known to one skilled in the art.

Other common elements of a computer include main memory (105), which is typically volatile semiconductor memory in current computers, I/O subsystem (112), which typically includes non-volatile storage devices such as magnetic, optical or semiconductor disks, keyboard, display, speaker, microphone, etc., and a network interface (113), which connects the computer to one or more data communications networks, such as the Internet, radio networks, etc. Several physical interfaces may be employed for the I/O subsystem and the network interface, or they may share a single physical interface.

The computer also comprises a knowledge base (106) in main memory. The knowledge base may be a complete self-contained knowledge base, or it may be a partition of a larger knowledge base stored, e.g., on a distributed server or a local disk. The knowledge base may also be a delta to larger knowledge base. Here "delta to a knowledge base" means a set of changes that have been made to a larger knowledge base but have not yet been merged to it; an example would be local changes (additions, deletions, modifications) that have not yet been set to a centralized server for merging into a global database. The knowledge base may be very big (tens or hundreds of gigabytes or even more).

The knowledge base contains knowledge interpretable by one or more computer-based application programs, and the data is represented as logical formulas (e.g., Horn clauses, first order formulas, reified formulas), semantic networks, conceptual structures, frames, scripts, plans, or other similar data structures, or their combinations, and may also comprise statistical information (such as information used for machine learning, probability information, or weight information).

According to the invention, a virtual copy is created of the knowledge base using the virtual memory facilities provided by the operating system and the processor. (107) illustrates such a virtual copy. The virtual copy is essentially a copy of the knowledge base (106) at the same virtual address but in either a different address space (e.g., if in a different process) or at different virtual addresses. When created, the virtual copy shares the same physical memory with the original knowledge base. However, the virtual copy is created using copy-on-write virtual memory mappings, such that whenever an address in the original knowledge base is written, the appropriate memory block (typically a virtual memory page) containing the written address is automatically copied, so that even if the knowledge base is modified after making the copy, such changes are not visible in the virtual copy. Creating such virtual copies is very fast and efficient on most current computers, and they do not consume much excess physical memory, even if the knowledge base is very large. Only when one copy is written does duplicate physical memory get allocated for the copy of the written location (typically on a page-by-page basis); if only a small percentage of pages is written during the lifetime of the virtual copy, then the overall memory overhead remains low.

The computer also comprises a copy-on-write means (108) for implementing the making and maintaining of the virtual memory copy, a consistent state means (109) for bringing the knowledge base to a consistent state, and a serializing means (110) for serializing the knowledge base into persistent storage. Each of these means may be realized in the various embodiments as computer readable program code means stored on a computer readable medium (such as the main memory or any other computer readable medium, such as a flash memory, magnetic disk, non-volatile memory, optical disk, networked storage, file server, downloadable file, or as computer-decodable signals transmitted over a communications network, wired or wireless), as special purpose firmware in an embedded system, as optimized logic on an ASIC, using a dedicated co-processor, within a special processor, or in any other suitable manner or form.

Figure 2:
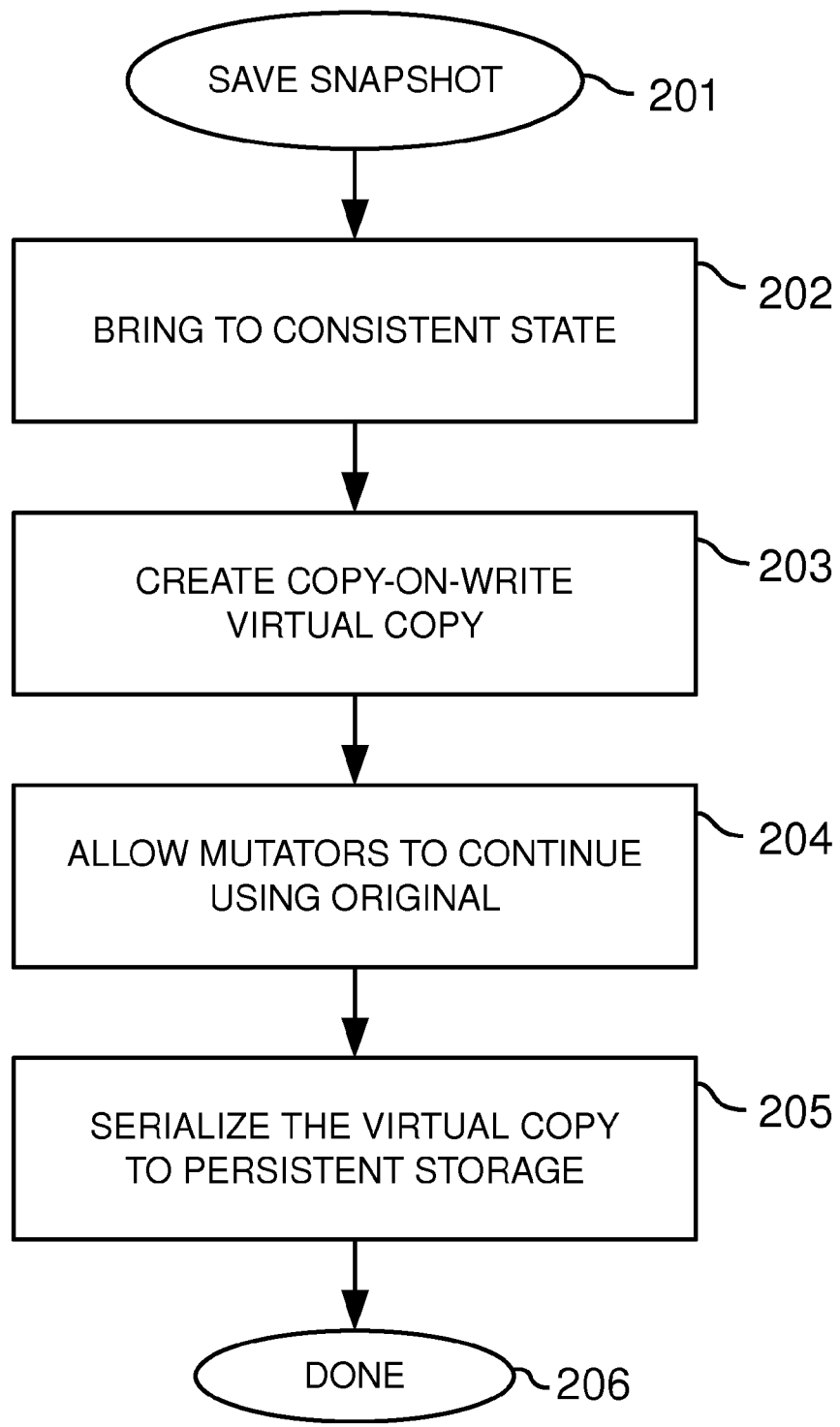
FIG. 2 illustrates the process of taking a snapshot of a knowledge base.

FIG. 2 illustrates the method according to the present invention on a general level.

(201) indicates the start of taking a snapshot of the knowledge base.

(202) illustrates the actions related to bringing the knowledge base to a consistent state by the consistent state means. What a consistent state means depends on the type of the knowledge base. If the knowledge base supports atomic transactions for controlling concurrent access to the knowledge base, consistent state generally means that each transaction is either fully reflected in the knowledge base or not at all. Bringing the knowledge base to a consistent state may involve ensuring that no transaction commit is currently executing (or taking a lock that prevents further transactions from modifying the database and then waiting until all active transactions have committed or aborted. The exact method depends on the concurrency control mechanism used with the knowledge base and whether partial transactions write their changes immediately to the knowledge base or whether they are kept in a per-transaction delta. In a particularly simple case, assuming transactions only modify the main database after it is known that they can commit successfully and that transactions take a mutual exclusion lock called 'commit_lock' for the duration of making their updates, this step can be just something like:

mutex_lock(commit_lock);

(203) illustrates making a copy-on-write virtual copy of the knowledge base by the copy-on-write means. In the preferred embodiment under Linux-like operating systems, this step together with creating a new process to perform the serialization and writing can be performed using a single system call:

fork( );

However, on systems that do not support forking a process (with copy-on-write semantics), such as many versions of the Microsoft Windows operating system and many embedded systems, it is necessary to use different mechanisms. If the system supports the mmap function, then it can be used to create a new virtual mapping for an existing memory area, with copy-on-write semantics. If the knowledge base is stored in consecutive memory addresses, then something like the following can be used:

```
int fd = open(tmpfilename, O_RDWR|O_CREAT|O_TRUNC, 0666);
size_t length = XXX;
off_t offset = 0;
void *kb_addr = mmap(NULL, length, PROT_READ|PROT_WRITE,
    MAP_PRIVATE, fd, offset);
... populate the knowledge base ...
...
... bring it to consistent state ...
void *copy_addr = mmap(NULL, length, PROT_READ|PROT_WRITE,
    MAP_PRIVATE, fd, offset);
```

If the knowledge base consists of several non-contiguous memory blocks, then a several mmap calls might be used to initially allocate space for it, and a corresponding number of mmap calls could be used to make a virtual copy (each call using a different offset, such that the ranges in the file do not overlap). The file could be a temporary file, and on some systems, a file on a special device or file system for temporary memory mappings that have no disk file to back them.

On Microsoft Windows, the MapViewOfFile function with the FILE_MAP_COPY option could be used to create memory mappings in an analogous manner.

Other mechanisms for making the virtual copy are also possible. For example, in the Mach operating system it would be possible to send the virtual memory pages containing the knowledge base to another thread or process using a message sent to a port. Shared memory can also be used to implement the virtual copying. In some embodiments the virtual copy may also be made by directly programming the virtual memory means of the processor(s). All these embodiments have in common that they make use the virtual memory means of at least one processor to make the copy, either directly or indirectly through calls (e.g., to the operating system) that use the virtual memory means in at least one processor.

(204) illustrates allowing mutators, that is, operations that modify the original knowledge base to continue. In its simplest form (corresponding to the example for (203) above, it can be just something like:

mutex_unlock(commit_lock);

(205) illustrates serializing the virtual copy and writing it to persistent storage (typically a disk or a network protocol connection to a remote server that will store it in persistent storage; in some distributed systems, also storage in volatile memory on a different node may sometimes suffice) by the serializing means. The serializing and writing are preferably performed simultaneously, so that there is no need to store the entire serialized knowledge base in main memory before writing it (the serialized representation can be quite large if the knowledge base is tens or hundreds of gigabytes). However, it is also possible to do the serialization first and then write the result.

Serializing the knowledge base can be performed using any known method for serializing (or linearizing) an object graph or a knowledge base. One possible method that is capable of handling very large object graphs including cyclic and shared data is disclosed in the co-owned U.S. patent application Ser. No. 12/360,202 by the same inventor, which is incorporated herein by reference. Another possible serialization method is the built-in serialization mechanism in the Java programming language.

The serialization in (205) is typically performed using a separate process (if the fork function is used). In that case, the virtual copy typically resides in the same virtual memory addresses as the original knowledge base (but in a different address space). In such embodiments, a standard serialization or linearization function can be used.

If the virtual copy is mapped to different addresses from the original knowledge base, then special serialization code must be used. Essentially, the serialization process must be changed so that every pointer in the knowledge base that points to another part of the knowledge base must be adjusted to point to the correct address in the virtual copy (correct address means the address of the same logical object (or more precisely, the virtual copy thereof) that the pointer pointed to in the original knowledge base). If the entire knowledge base is in a contiguous address range, then only an offset (the difference of the starting addresses of the virtual copy and the original knowledge base) needs to be added to each pointer. This can be done, e.g., whenever reading a pointer during serialization. However, if the knowledge base is not contiguous, then it may be necessary to identify which contiguous region of the knowledge base the pointer points to, look up the new address (or difference) for that region, and add the difference to the pointer. Identifying the contiguous region may be performed by indexing an array of memory regions (index being, e.g., "(addr-first_offset)/region_size"), looking it up from any suitable index data structure, such as an interval tree, or comparing the pointer values against start and/or end values of special regions such as a nursery (young object area), large object area, or a popular object area.

Pointers that point out from the knowledge base to, e.g., constant data or partitions that are not being included in the snapshot need not be mapped in some embodiments.

Pointers here mean any links between objects. They may be, e.g., memory addresses, tagged memory addresses, object identifiers, indexes to an array comprising references to objects, unique object identifiers, persistent object identifiers, or generally object identifiers in a distributed system.

At (206) the snapshot is complete, and the virtual copy can be freed. Freeing would typically be done by exiting the process that performed the serialization (if the fork function was used to create the virtual copy), using the munmap function (if mmap was used to create the virtual copy), or using UnmapViewOfFile (if MapViewOfFile was used to create the virtual copy), or using any other suitable mechanism for freeing the virtual copy.

In the application program comprising the knowledge base (106) special synchronization or restrictions to modifying the knowledge base are, in most embodiments, only required while bringing it to consistent state (202) and creating the copy-on-write virtual copy (203). These are both fairly fast operations (fast enough not to cause problems in interactive use). The serialization and writing can take several orders of magnitude longer for large knowledge bases. Thus, the snapshot can be taken without blocking accesses or updates to the knowledge base for any significant period and without significantly complicating the transaction logic (if any) used in the knowledge base. This is a major improvement over existing technology, and may even be the critical enabling factor for some applications using large knowledge bases.

Many variations of the above described embodiments will be available to one skilled in the art without deviating from the essence of the invention as set out herein and in the claims. In particular, some operations could be reordered, combined, or interleaved, or executed in parallel, and many of the data structures could be implemented differently. When one element, step, or object is specified, in many cases several elements, steps, or objects could equivalently occur. Steps in flowcharts could be implemented, e.g., as state machine states, logic circuits, or optics in hardware components, as instructions, subprograms, or processes executed by a processor, or as a combination of these and other techniques.

It is to be understood that the aspects and embodiments of the invention described herein may be used in any combination with each other. Several of the aspects and embodiments may be combined together to form a further embodiment of the invention, and not all features, elements, or characteristics of an embodiment necessarily appear in other embodiments. A method, a computer, or a computer program product which is an aspect of the invention may comprise any number of the embodiments or elements of the invention described herein. Separate references to "an embodiment" or "one embodiment" refer to particular embodiments or classes of embodiments (possibly different embodiments in each case), not necessarily all possible embodiments of the invention.

What is claimed is:

1. A method for saving a snapshot of a large knowledge base comprising a cyclic data structure without blocking, comprising:
   bringing, using a consistent state means in a computer, the knowledge base to a consistent state;
   creating, using a copy-on-write means in a computer, a copy-on-write virtual copy of the knowledge base and thereafter allowing mutators to continue modifying the knowledge base; and
   serializing, using a serializing means in a computer, the virtual copy of the knowledge base into a snapshot of the knowledge base in persistent storage without blocking accesses or updates to the knowledge base, and in response to completing the snapshot, freeing the virtual copy of the knowledge base.

2. The method of claim 1, further comprising:
   while the serializing is being performed, making updates to the knowledge base from other threads or processes.

3. The method of claim 1, wherein bringing the knowledge base to a consistent state involves taking a global lock that is used to synchronize updates to the knowledge base during transaction commits.

4. The method of claim 1, wherein creating a copy-on-write virtual copy of the knowledge base comprises using the fork function.

5. The method of claim 1, wherein creating a copy-on-write virtual copy of the knowledge base comprises calling the mmap function one or more times.

6. The method of claim 1, wherein creating a copy-on-write virtual copy of the knowledge base comprises calling the MapViewOfFile function one or more times.

7. The method of claim 1, wherein the serialization is performed using a serialization method capable of handling object graphs that comprise cyclic data.

8. The method of claim 1, wherein the serialization is performed using the built-in serialization method in Java.

9. The method of claim 1, wherein the serializing comprises adjusting pointers so that they point to the correct address in the virtual copy.

10. A computer comprising:
    one or more processors (101), with at least one of the processors equipped with a virtual memory means (102);
    a consistent state means (109);
    a copy-on-write means (108) configures to make use of the virtual memory means to create a virtual copy of a knowledge base comprising a cyclic data structure
    brought into a consistent state using the consistent state means before allowing mutators to continue modifying the knowledge base; and
    a serializing means (110) for serializing the virtual copy of the knowledge base into a snapshot of the knowledge base in persistent storage without blocking access or updates to the knowledge base before freeing the virtual copy of the knowledge base.

11. A computer program product stored on a non-transitory computer readable medium operable to cause a computer to save a snapshot of a large main memory knowledge base comprising a cyclic data structue without blocking, comprising:
    computer usable program code means for bringing the knowledge base to a consistent state;
    computer usable program code means for creating a copy-on-write virtual copy of the knowledge base brought to a consistent state and thereafter allowing mutators to continue modifying the knowledge bas; and
    computer usable program code means for serializing the virtual copy of the knowledge base into a snapshot of the knowledge base in persistent storage without blocking accesses or updates to the knowledge base, and in response to completing the snapshot, freeing the virtual copy of the knowledge base.

* * * * *